United States Patent
Tanaka

(10) Patent No.: US 6,796,579 B2
(45) Date of Patent: Sep. 28, 2004

(54) GAS GENERATOR WITH AIRBAG DEVICE

(75) Inventor: Shinichi Tanaka, Hikone (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/091,473

(22) Filed: Mar. 7, 2002

(65) Prior Publication Data

US 2002/0135170 A1 Sep. 26, 2002

(30) Foreign Application Priority Data

Mar. 23, 2001 (JP) .................................... 2001-085452

(51) Int. Cl.[7] ............................................ B60R 21/26
(52) U.S. Cl. .................................... 280/736; 280/741
(58) Field of Search ................................ 280/741, 736, 280/731, 737

(56) References Cited

U.S. PATENT DOCUMENTS

| | | | | |
|---|---|---|---|---|
| 4,530,516 A | * | 7/1985 | Adams et al. ............... | 280/741 |
| 5,387,007 A | * | 2/1995 | Ogawa et al. .............. | 280/740 |
| 5,501,152 A | * | 3/1996 | Zeuner et al. .............. | 102/292 |
| 5,613,705 A | * | 3/1997 | Hock et al. ................. | 280/741 |
| 5,753,852 A | * | 5/1998 | Bernau et al. .............. | 102/530 |
| 5,779,267 A | * | 7/1998 | Jordan et al. ............... | 280/740 |
| 5,938,236 A | * | 8/1999 | Tanaka et al. .............. | 280/741 |
| 5,984,352 A | * | 11/1999 | Green et al. ................ | 280/736 |
| 6,053,531 A | * | 4/2000 | Katsuda et al. ............. | 280/741 |
| 6,079,739 A | * | 6/2000 | Perotto et al. .............. | 280/736 |
| 6,135,496 A | * | 10/2000 | Katsuda et al. ............. | 280/736 |
| 6,149,746 A | * | 11/2000 | Blomquist ................... | 149/46 |
| 6,170,869 B1 | * | 1/2001 | Tomiyama ................... | 280/741 |
| 6,283,505 B1 | * | 9/2001 | Saso et al. .................. | 280/741 |
| 6,257,617 B1 | * | 4/2002 | McFarland et al. ......... | 280/736 |
| 6,378,901 B1 | * | 4/2002 | Yamazaki et al. .......... | 280/741 |
| 6,406,060 B1 | * | 6/2002 | Katsuda et al. ............. | 280/736 |
| 6,431,598 B2 | * | 8/2002 | Saso et al. .................. | 280/741 |
| 6,447,007 B1 | * | 9/2002 | DiGiacomo et al. ........ | 280/741 |
| 6,540,256 B2 | * | 4/2003 | Iwai et al. .................. | 280/736 |
| 6,620,269 B1 | * | 9/2003 | Canterberry et al. ........ | 149/96 |
| 6,626,461 B2 | * | 9/2003 | Koga et al. ................. | 280/736 |

* cited by examiner

Primary Examiner—Paul N. Dickson
Assistant Examiner—Deanna Draper
(74) Attorney, Agent, or Firm—Manabu Kanesaka

(57) ABSTRACT

A gas generator is formed of a container having an outer-shell member, and a partition member disposed at least partly inside the outer-shell member to thereby form a plurality of chambers inside the container and fixed to the outer-shell member, a fixation area increasing portion formed at at least one of the partition member and the outer-shell member, a gas generating agent disposed inside the plurality of chambers of the container, and an igniter for igniting the gas generating agent. The gas generator reliably prevents the gas leak from a portion of fixation of the outer-shell member and the partition member.

4 Claims, 5 Drawing Sheets

GAS GENERATOR WITH AIRBAG DEVICE

BACKGROUND OF THE INVENTION AND RELATED ART STATEMENT

The present invention relates to an airbag device with a gas generator.

An airbag device installed in an automobile includes an airbag, a gas generator commonly called an inflator, and a module cover for covering the airbag. In an emergency of the automobile, such as when the automobile collides, the gas generator operates, causing the airbag to expand and to catch an occupant in the automobile.

FIG. 6 is a side view of an example of a conventional steering wheel; FIG. 7 is a front view of the conventional steering wheel; FIG. 8 is an enlarged sectional view taken along line 8—8 of FIG. 7; and FIG. 9 is a sectional view of a gas generator incorporated in an airbag device of this steering wheel.

As shown in FIGS. 6 and 7, an airbag device 14 is installed in an area situated at the inner side of a steering wheel 10. Reference numerals 12 denote spokes.

As shown in FIG. 8, the airbag device 14 comprises a retainer 20 fixed on the steering wheel by a bracket 18, an airbag 22 including a gas-introducing-opening edge portion mounted to the retainer 20, a gas generator or inflator 24 mounted to the retainer 20 for ejecting gas into the airbag 22, and a module cover 26 for covering the airbag 22. The base end side of the module cover 26 is connected to the retainer 20.

As shown in FIG. 9, the gas generator 24 is formed of a container which comprises an outer-shell member and a cylindrical partition member 29, wherein the outer-shell member is formed by an upper housing 27 and a lower housing 28, and the cylindrical partition member 29 is installed inside the outer-shell member. One end of the partition member 29 passes through and protrudes downward from an opening in the bottom surface of the lower housing 28. The inner peripheral surface defining the opening and the outer peripheral surface of the partition member 29 are welded together by, for example, laser beam welding. An igniting agent or booster propellant 30 is held at the inner side of the partition member 29, whereas a gas generating agent or main propellant 32 is held at the outer peripheral side of the partition member 29.

A squib 34 is installed at the aforementioned one end of the partition member 29, and is constructed so that the igniting agent 30 is ignited when the squib 34 is energized through a squib connector 36 and a squib lead wire 38. When the igniting agent 30 is ignited, gas is ejected from openings 40 of the partition member 29, so that the gas generating agent 32 is ignited. As a result, a large amount of gas is generated rapidly. The gas passes through a filter 42 formed by mesh or the like, and is ejected outward from the gas generator 24 through openings 44, causing the airbag 22 to expand. When the airbag 22 expands, the module cover 26 cleaves along a tear line, causing the airbag 22 to expand greatly inside the vehicle. The steering wheel is secured by a nut 48 and an externally threaded portion 46 at the top end of a steering shaft.

In the above-described gas generator, when the gas generating agent is ignited, the internal pressure in the container increases, so that a large stress is exerted on a connection portion of the lower housing 28 and the partition member 29.

An object of the present invention is to provide a gas generator including a structure for fixing a partition member and a container, which can sufficiently resist a large stress when a gas generating agent is ignited as mentioned above, and to provide an airbag device including the gas generator.

Further objects and advantages of the invention will be apparent from the following description.

SUMMARY OF THE INVENTION

A gas generator of the present invention includes a container; a gas generating agent inside the container; and an igniter for igniting the gas generating agent. The container includes an outer-shell member and a partition member fixed to the outer-shell member, and at least a portion of the partition member is disposed inside the outer-shell member. A plurality of chambers for containing the gas generating agent is formed by the partition member. A fixation area increasing portion is provided at at least one of the partition member and the outer-shell member.

In such a gas generator, since the fixation area of the partition member and the container is large, it is possible to sufficiently resist a large stress even when it is exerted on a connection portion of the partition member and the container when the gas generating agent is ignited.

In the gas generator of the present invention, it is preferable that the partition member has a cylindrical shape, with one end thereof being fixed to an inside surface of the outer-shell member at one side of the outer-shell member, and the other end thereof passing through and extending outward from an opening provided at the other side of the outer-shell member. In addition, it is preferable that an inner peripheral surface defining the opening and an outer peripheral surface of the tubular partition member are fixed together. Further, it is preferable that the fixation area increasing portion is used to increase a fixation area of the inner peripheral surface defining the opening and the outer peripheral surface of the partition member. When the gas generator is constructed in this way, since the fixation area of the partition member and the opening of the outer-shell member is large, gas leakage does not occur even when a large gas pressure is exerted on the fixation portion.

In this case, it is preferable that the fixation area increasing portion is an annular portion provided at the outer-shell member and protruding inside the outer-shell member. When the gas generator is constructed in this way, the annular portion is pushed against the outer peripheral surface of the partition member when the outer-shell member expands outward by the gas pressure as a result of ignition of the gas generating agent. Therefore, the connection between the outer-shell member and the partition member is made stronger, and gas leaks from a portion between these members is more reliably prevented.

In the present invention, it is preferable to fix the opening of the outer-shell member and the partition member by welding. In such a case, it is possible to considerably increase the weld strength between the partition member and the outer-shell member by increasing the welding depth, and to considerably reliably prevent gas leak from the portion between the partition member and the outer-shell member.

An airbag device of the present invention includes an airbag; any one of the above-described gas generators for generating gas to expand the airbag; and a module cover for covering the airbag.

DETAILED DESCRIPTION OF THE PREFERRED EMBODIMENTS

Figure 1:
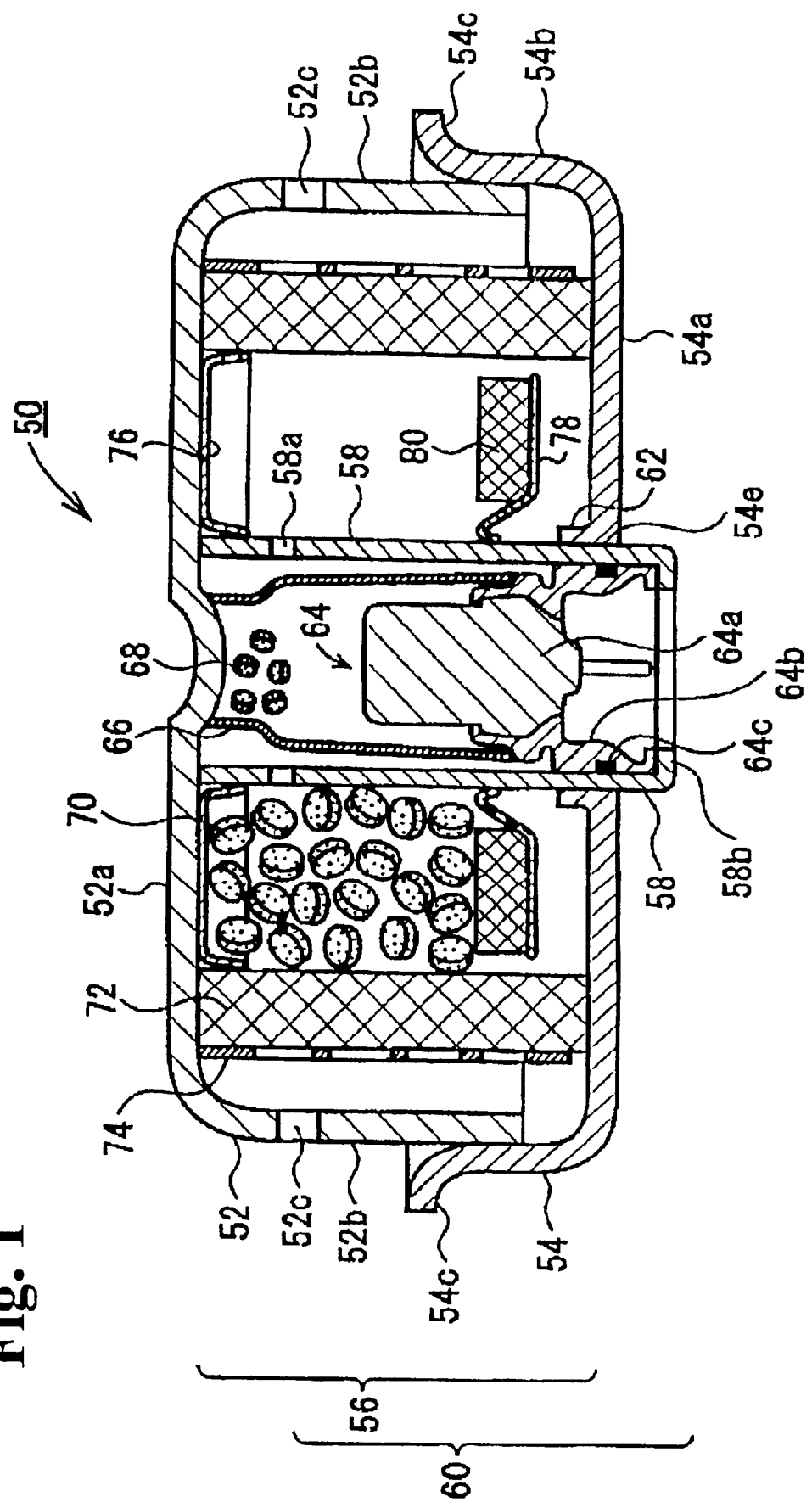
FIG. 1 is a sectional view of a gas generator of an embodiment of the present invention.
Figure 2:
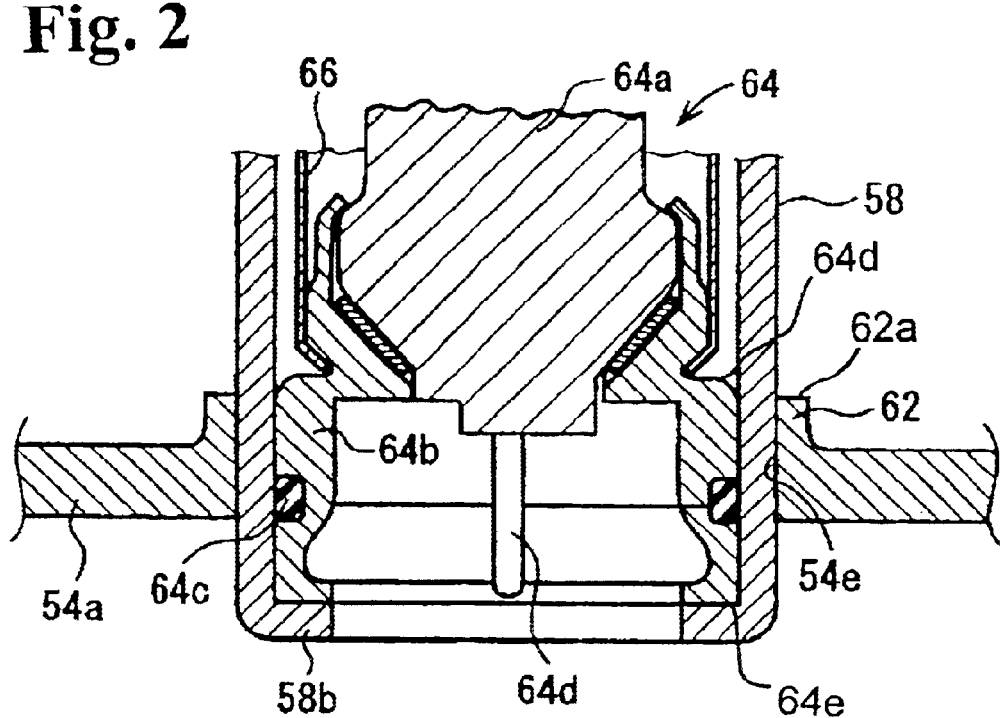
FIG. 2 is an enlarged view of the main portion of the gas generator shown in FIG. 1.
Figure 3:
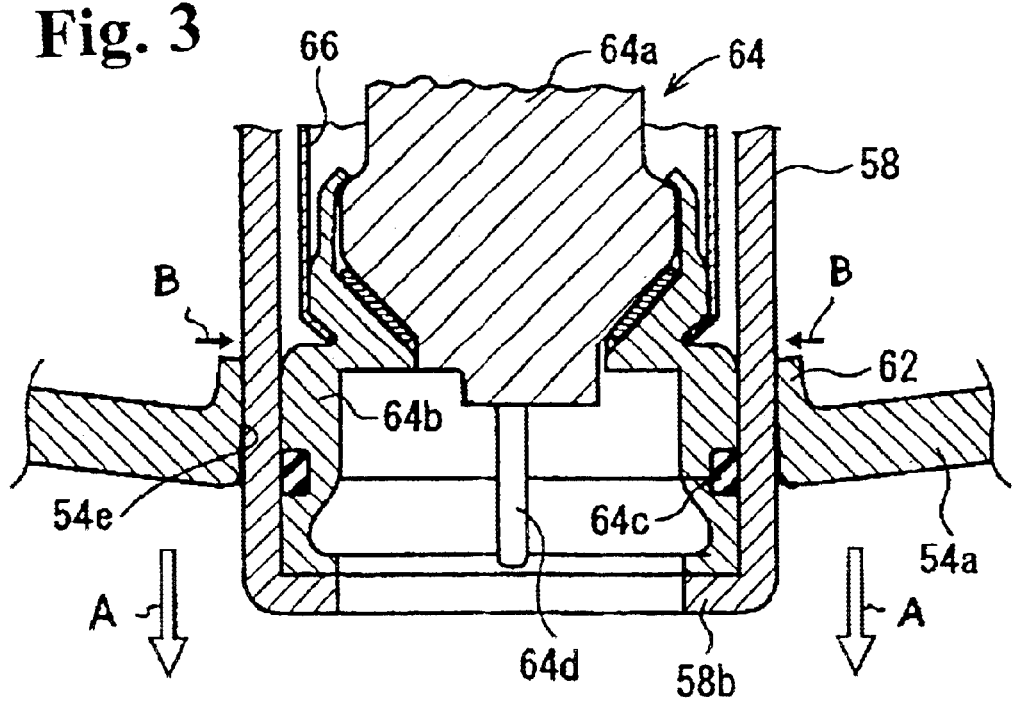
FIG. 3 is a sectional view showing the same portion as that shown in FIG. 2 when the gas generator ejects gas.
Figure 4:
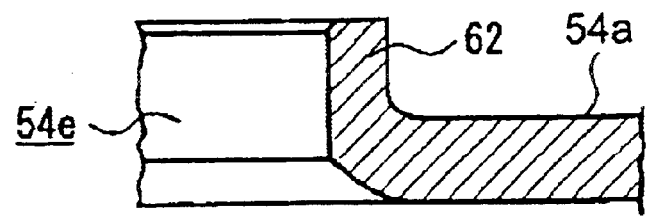
FIG. 4 is an enlarged sectional view of the main portion of a lower housing.
Figure 5:
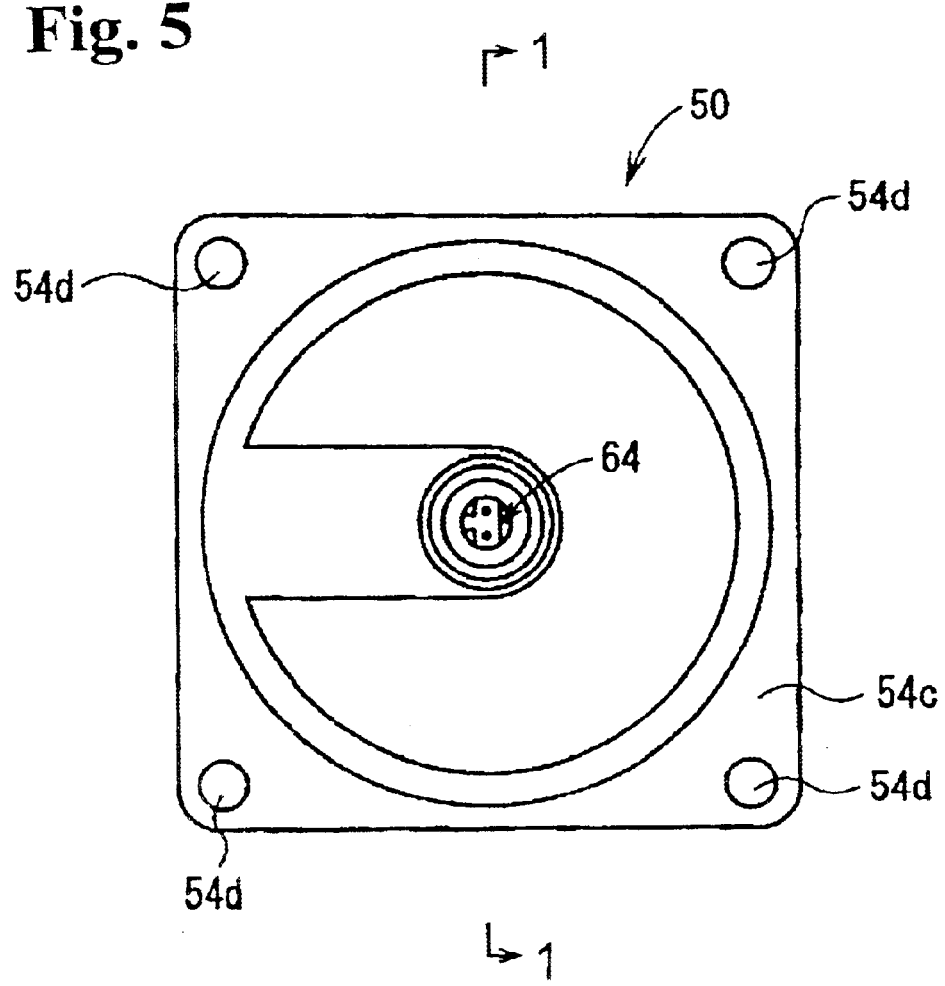
FIG. 5 is a bottom view of the gas generator.
Figure 6:
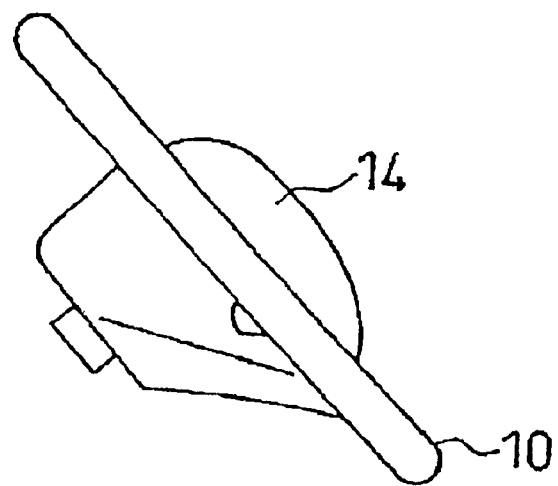
FIG. 6 is a side view of a conventional steering wheel.
Figure 7:
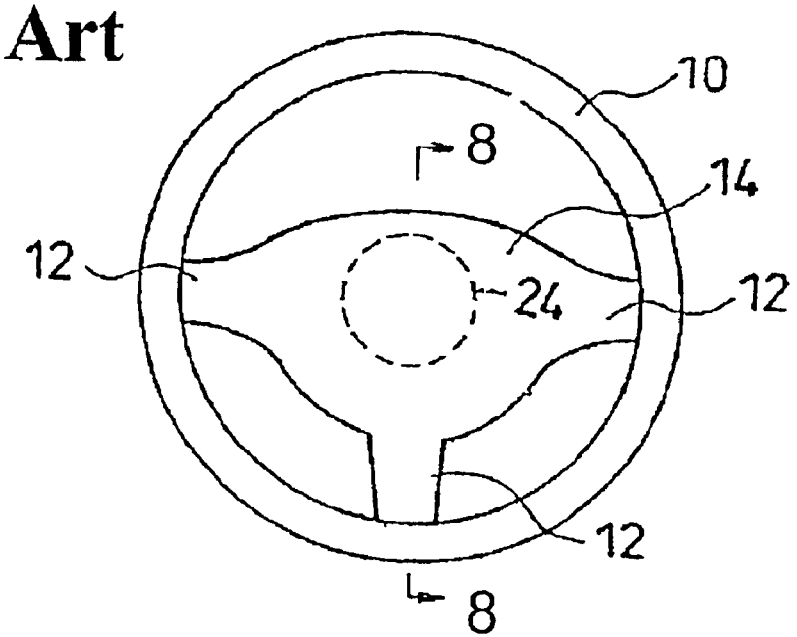
FIG. 7 is a front view of the conventional steering wheel.

Hereunder, a description of an embodiment of the present invention will be made with reference to FIGS. 1 to 5. FIG. 1 is a sectional view of an embodiment of a gas generator in accordance with the present invention, i.e. enlarged sectional view taken along line 1—1 of FIG. 5; FIG. 2 is an enlarged view of the main portion shown in FIG. 1; FIG. 3 is a sectional view showing the same portion as that shown in FIG. 2 when the gas generator is ejecting gas; FIG. 4 is an enlarged sectional view of the main portion of a lower housing; and FIG. 5 is a bottom view of the gas generator.

A gas generator 50 includes a container 60 which comprises an outer-shell member 56 formed by an upper housing 52 and a lower housing 54, and a cylindrical partition member 58. A large portion of the partition member 58 is located inside the outer-shell member 56 and a portion of the partition member 58 protrudes from the outer-shell member 56.

The upper housing 52 includes a substantially disk-shaped top plate 52a and a peripheral wall 52b inclining downward from the peripheral edge of the top plate 52a. A plurality of gas ports 52c is provided in the peripheral wall 52b.

The partition member 58 is disposed coaxially with the peripheral wall 52b of the upper housing 52. The top end surface of the partition member 58 is affixed to the top plate 52a by welding, such as projection welding. However, the method of affixation is not limited to welding. A plurality of gas ports 58a is provided in the upper portion of the partition member 58.

The lower housing 54 comprises a substantially disk-shaped bottom plate 54a and a peripheral wall 54b extending upward from the peripheral edge of the bottom plate 54a. The top edge of the peripheral wall 54b gradually widens outward, and continues to a flange 54c. As shown in FIG. 5, the flange 54c is a substantially square flange protruding at the outer periphery of the outer-shell member 56, and has insertion holes 54d at four corners thereof for, for example, bolts or rivets.

A circular opening 54e is provided at the center of the bottom plate 54a, and the partition member 58 is inserted in the opening 54e. An annular portion 62 with an inner edge 62a is provided so as to protrude upward from the end portion defining the opening 54e. In the embodiment, as shown in FIG. 4, the annular portion 62 is formed by burring the bottom plate 54a, but the method of forming the annular portion 62 is not limited to the burring process.

A large portion of the partition member 58 is disposed inside the outer-shell member 56, with the portion near the lower end thereof alone passing through and protruding downward from the opening 54e. A squib 64 is inserted in the lower portion inside the partition member 58. The squib 64 comprises a squib body 64a and a substantially tubular squib holder 64b externally fitted onto the squib body 64a and having an upper edge 64d and a lower edge 64e. A gasket mounting groove is provided in the outer peripheral surface of the squib holder 64b in order to dispose a gasket 64c in the gasket mounting groove. An O-ring, formed of heat-resistant rubber or the like, may be used as the gasket 64c. The gasket 64c contacts the inner peripheral surface of the partition member 58 to make them airtight.

An inwardly facing flange 58b is formed at the bottom end of the partition member 58 by, for example, pressing. The bottom end of the squib holder 64b is held by the flange 58b. Although not shown, a squib connector is connected to a terminal 64d at the bottom end of the squib 64.

An enhancer cup 66, formed of, for example, a low-melting metal such as aluminum, is disposed inside the partition member 58. An igniting agent (booster propellant) 68 is provided inside the enhancer cup 66. When the squib 64 is energized, the booster propellant starts to react. When the temperature and the gas pressure inside the enhancer cup 66 become sufficiently high, the enhancer cup 66 tears, so that gas is ejected via the gas ports 58a onto a gas generating agent (main propellant) 70, which starts reacting to generate gas. Although sodium azide or the like may be used for the igniting agent and the gas generating agent, the substances which may be used for these agents are not limited thereto.

The gas generating agent 70 is filled in the portion between the partition member 58 and a filter 72. The filter 72 is formed by hardening a metallic wire net or mesh into an annular shape by press molding or the like. An annular filter holder 74, using a perforated plate formed of, for example, a punching metal, is disposed along the outer peripheral surface of the filter 72.

A substantially disk-shaped filter positioning member 76 with a center hole is disposed between the inner peripheral surface of the top portion of the filter 72 and the top portion of the partition member 58.

A substantially disk-shaped spatter shield 78 with a center hole is externally fitted to the lower portion of the partition member 58. A cushion 80 is disposed on the top side of the spatter shield 78. The gas generating agent 70 is provided between the filter positioning member 76 and the cushion 80.

In forming the gas generator 50, the upper housing 52 and the partition member 58 are fixed to each other by, for example, projection welding. The enhancer cup 66, the squib 64, and the igniting agent 68 are put into the partition member 58, and the bottom end of the partition member 58 is pressed in order to form the flange 58b.

The upper housing 52 is set in a posture with the top and bottom sides reversed with respect to those shown in FIG. 1. First, the filter positioning member 76 and the filter 72 with the filter holder 74 are installed in the upper housing 52. Then, the upper housing 52 is filled with the gas generator 70, and the cushion 80 and the spatter shield 78 are disposed so as to hold the gas generating agent 70.

The lower housing 54 is mounted to the upper housing 52. The inside diameters of the opening 54e and the annular portion 62 are set slightly smaller than the outside diameter of the partition member 58. The partition member 58 is press-fitted to the annular portion 62 and the opening 54e. The peripheral wall 52b of the upper housing 52 is press-fitted to the peripheral wall 54b of the lower housing 54.

Thereafter, the contact portion of the partition member 58 and the opening 54e and the contact portion of the peripheral walls 52b and 54b are respectively subjected to laser beam welding. In the welding, since the inner peripheral surface of the annular portion 62 contacts the outer peripheral surface of the partition member 58, the weld penetration depth (depth of welding in a direction parallel to an axial line of the partition member 58) can be made sufficiently large. The spatter shield 78 prevents the gas generator 70 from being irradiated with laser light which leaks during the laser beam welding of the partition member 58 and the edge of the opening 54e, and welding pieces or spatter from contacting the gas generator 70.

Figure 8:
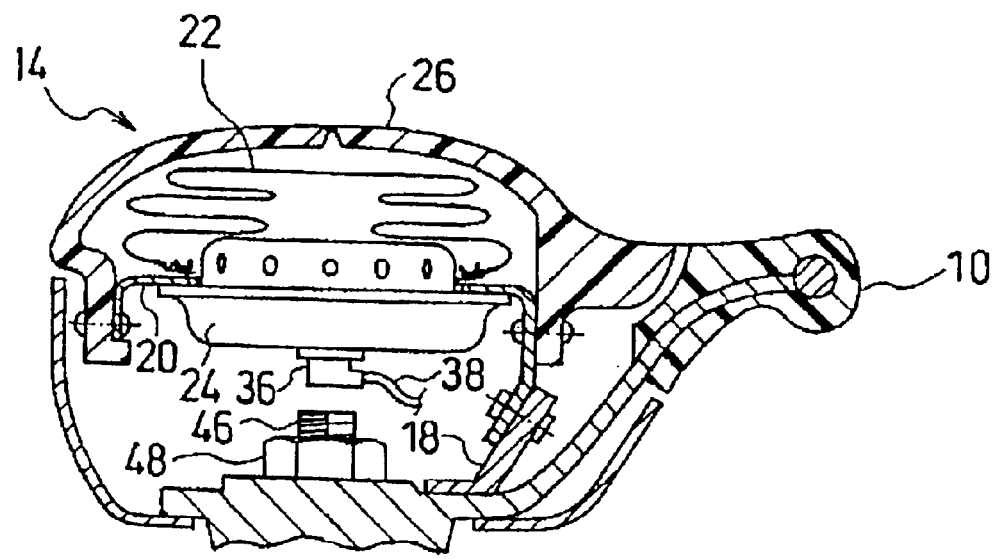
FIG. 8 is a sectional view taken along line 8—8 of FIG. 7.
Figure 9:
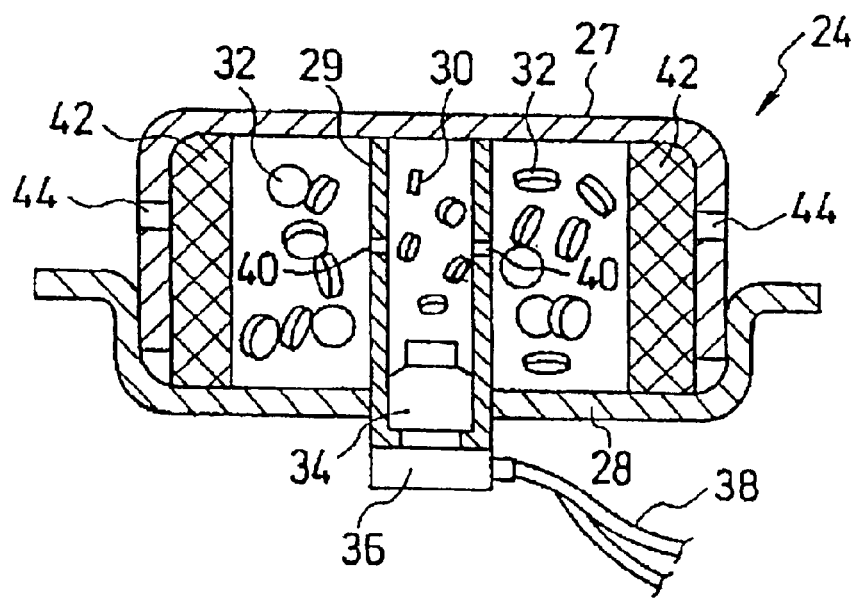
FIG. 9 is a sectional view of the conventional gas generator of the airbag device shown in FIG. 8.

The gas generator 50 constructed in this way is incorporated in an airbag device, such as that shown in FIG. 8. Although the gas generator 50 is incorporated in the airbag device shown in FIG. 8 for the driver's seat, the gas generator 50 may be applied to various airbag devices, such as a passenger airbag device, a back-seat airbag device, a side airbag device, and an airbag device for protecting the head of an occupant.

By energizing the squib 64 of the gas generator 50, the igniting agent 68 is ignited, and generated gas is ejected by passing through the gas ports 58a of the partition member 58, causing the gas generator 70 to react to generate gas. By this, a large amount of gas is generated. This gas is ejected through the filter 72 and the gas ports 52c of the upper housing 52, causing the airbag to expand.

As mentioned above, since the weld penetration depth at the welded portion of the partition member 58 and the opening 54e of the lower housing 54 is large, the partition member 58 and the lower housing 54 are firmly connected together, thereby reliably preventing the gas leak from the welded interface. In the embodiment, when the gas generator 50 is used to generate gas, the bottom plate 54a of the lower housing 54 tries to expand downward in FIG. 1 by the pressure of the gas. However, the annular portion 62 is provided in an upstanding manner so as to extend upward from the bottom plate 54a, so that, as shown in FIG. 3, when the bottom plate 54a starts expanding outward (in the direction of arrows A), the annular portion 62 tries to tilt towards the center of the opening 54e (in the directions of arrows B) and to bite the outer peripheral surface of the partition member 58. Therefore, the bottom plate 54a and the partition member 58 are more firmly connected together, and the gas leak from the portion between the partition member 58 and the opening 54e is more reliably prevented.

In this embodiment, as shown in FIG. 4, the annular portion 62 is formed by burring, and the outer corner edge defining the opening 54e is rounded. Therefore, a groove-like beveled portion is formed between the outer peripheral surface of the tubular partition member 58 inserted in the opening, and the outer corner edge defining the opening 54e, so that the area of fusion by the laser beam welding becomes large, thereby causing the weld strength to be high. The surface defining the opening formed by burring is smooth as compared to that formed by punching, so that it is not necessary to finish the surface by cutting.

As described above, the present invention provides a gas generator which reliably prevents the gas leak from the portion of fixation of the outer-shell member and the partition member as a result of a high fixing strength between the outer-shell member and the partition member; and an airbag device using the gas generator.

While the invention has been explained with reference to the specific embodiments of the invention, the explanation is illustrative, and the invention is limited only by the appended claims.

What is claimed is:

1. An airbag device comprising:

an air bag;

a gas generator for generating gas for expanding the airbag comprising:

a container including an outer-shell member with an opening, and a partition member disposed at least partly inside the outer-shell member to form a plurality of chambers inside the container and fixed to the outer-shell member, said partition member having one end fixed to an inside surface of the outer-shell member and the other end passing through and extending outward from the opening of the outer-shell member, a fixation area increasing portion formed of an annular portion provided at the outer-shell member to protrude inwardly of the outer-shell member for defining the opening and having an inner edge, said annular portion fitting onto the partition member for increasing connection between the outer-shell member and the partition member, a gas generating agent disposed inside the plurality of chambers of the container, an igniter disposed in the partition member for igniting the gas generating agent, and an annular squib holder located inside the partition member to support the igniter thereon and face the fixation area increasing portion of the outer-shell member, said squib holder having an upper edge contacting the partition member which is substantially located in a horizontal level where the inner edge of the annular portion is located so that the squib holder and the annular portion sandwich the partition member therebetween to securely hold and support the partition member; and a module cover for covering the airbag.

2. An airbag device according to claim 1, wherein an inner peripheral surface of the annular portion for defining the opening of the outer-shell member and an outer peripheral surface of the tubular partition member are fixed together.

3. An airbag device according to claim 2, wherein the inner peripheral surface defining the opening of the outer-shell member and the outer peripheral surface of the partition member are welded together.

4. An airbag device according to claim 1, further comprising an enhancer cup disposed between the squib holder and the inside surface of the outer-shell member inside the partition member.

* * * * *